United States Patent [19]

Clark et al.

[11] 4,144,216

[45] Mar. 13, 1979

[54] ROOM TEMPERATURE VULCANIZABLE ORGANIC SOLVENT DISPERSIONS OF SILICONE ELASTOMERS

[75] Inventors: William H. Clark; Charles E. Skinner, both of Midland, Mich.

[73] Assignee: Dow Corning Corporation, Midland, Mich.

[21] Appl. No.: 578,706

[22] Filed: May 19, 1975

[51] Int. Cl.$^2$ .................. C08K 5/02; C08K 5/07; C08K 5/09
[52] U.S. Cl. .................. 260/31.2 R; 260/31.4 R; 260/31.8 S; 260/32.8 SB; 260/33.2 SB; 260/33.6 SB; 260/33.8 SB
[58] Field of Search .................. 260/31.2 R, 31.8 S, 260/33.2 SB, 33.4 SB, 33.6 SB, 33.8 SB, 46.5, 31.4 R

[56] References Cited

U.S. PATENT DOCUMENTS

| | | | |
|---|---|---|---|
| 2,927,907 | 3/1960 | Polmanteer | 260/46.5 |
| 3,133,891 | 5/1964 | Ceyzeriat | 260/375 B |
| 3,305,502 | 2/1967 | Lampe | 260/33.4 SB |
| 3,308,080 | 3/1967 | Haenni | 260/33.2 SB |
| 3,642,692 | 2/1972 | Hartlage | 260/46.5 G |

*Primary Examiner*—J. Ziegler
*Attorney, Agent, or Firm*—Roger H. Borrousch

[57] ABSTRACT

A mixture of a hydroxyl endblocked polydimethylsiloxane, ethylpolysilicate, monoorganotriacetoxysilane, organotin carboxylate, an extending filler and organic solvent provides dispersions which cure to silicone elastomers at room temperature. These compositions have long storage life and can be made into compositions which are storable for extended periods of time in a single container if kept under substantially anhydrous conditions. These compositions can be prepared extrudable or sprayable, are pigmentable, have high strengths, and are readily prepared.

10 Claims, No Drawings

ROOM TEMPERATURE VULCANIZABLE ORGANIC SOLVENT DISPERSIONS OF SILICONE ELASTOMERS

BACKGROUND OF THE INVENTION

1. Field of the Invention

This invention relates to room temperature vulcanizable silicone elastomeric compositions in organic solvent.

2. Description of the Prior Art

Silicone elastomers which cure at room temperature have been known for some time. Such elastomers have been prepared by using crosslinking systems which cure upon mixing the ingredients, such compositions are stored in two or more containers; and by using crosslinking systems which are stable in the absence of moisture but which cure upon exposure to moisture, such compositions are storable in a single container. The first type are usually packaged in at least two containers and are put to use by mixing the contents of the two containers whereas the second type are packaged in one container which seals out atmospheric moisture and are used merely by removing the contents of the container and permitting it to come into contact with the atmosphere.

One type of silicone elastomer which is stored in two containers and which cures upon mixing a hydroxylated organosiloxane, an alkyl polysilicate and a metal carboxylate is well known as described by Polmanteer in U.S. Pat. No. 2,927,907.

A one package room temperature vulcanizable silicone elastomeric composition which combines a hydroxylated organosiloxane, an acyloxysilane and a metal salt of a carboxylic acid is well known as described by Bruner in U.S. Pat. No. 3,077,465. These compositions described by Bruner are stable in the absence of moisture but cure when exposed to atmospheric moisture.

Hartlage in U.S. Pat. No. 3,642,692 describes a one package composition which is stable in the absence of moisture but cures to a silicone elastomer when exposed to moisture. The compositions described by Hartlage consist essentially of 100 parts by weight hydroxyl radical terminated polydiorganosiloxane having a viscosity of from 1,000 to 50,000 cs. at 25° C., 0.5 to 15 parts by weight of

R'Si(OOCCH$_3$)$_3$ where R' is methyl, ethyl, vinyl, n-propyl, isopropyl, n-butyl, isobutyl, amyl and phenyl and 0.5 to 5 parts by weight of an ethoxylated compound selected from tetraethoxysilane and ethylpolysilicate. These compositions of Hartlage have improved cleanability compared to compositions which do not contain the ethoxylated compounds. The silicone elastomers obtained by Hartlage have durometers on the Shore A scale of about 28, a tensile of about 240 p.s.i., (pounds per square inch), an elongation of about 380 and a Die B tear strength of about 25 p.p.i. (pounds per inch).

It was unexpected that tougher silicone elastomers could be obtained by combining ethylpolysilicate and monoorganotriacetoxysilane in certain ratios as crosslinking agents to crosslink high viscosity hydroxylated polydimethylsiloxane in an organic solvent.

SUMMARY OF THE INVENTION

An object of this invention relates to a silicone elastomeric composition which cures at room temperature, has reasonable storage life, is tougher and can be extruded or sprayed.

This invention relates to a silicone elastomeric composition obtained by mixing a hydroxyl endblocked polydimethylsiloxane, soluble ethylpolysilicate, monoorganotriacetoxysilane, organotin carboxylate, extending filler and organic solvent where the composition is extrudable or sprayable and has a storage life of greater than about one week in the absence of moisture and cures to elastomers which are tough as shown by the combination of properties of tensile strength, elongation and tear strength.

DESCRIPTION OF THE INVENTION

This invention relates to a silicone elastomeric composition obtained by mixing ingredients consisting essentially of (A) 100 parts by weight of a benzene soluble hydroxyl endblocked polydimethylsiloxane having a viscosity of at least 100,000 cps. at 25° C., (B) from 5 to 75 parts by weight of a soluble ethylpolysilicate, (C) from 1 to 20 parts by weight of monoorganotriacetoxysilane wherein the organic radical is an alkyl radical of less than four carbon atoms, (D) from 0.1 to 2 parts by weight of organotin carboxylate, (E) from 10 to 150 parts by weight of an extending filler, and (F) sufficient organic solvent to provide a solvent content of from 10 to 95 weight percent solvent based on the total weight of the composition, said organic solvent being selected from the group consisting of aliphatic hydrocarbons, chlorinated aliphatic hydrocarbons, aromatic hydrocarbons, ketones, esters, alcohols, ethers and mixtures thereof wherein said organic solvent is a solvent for the silicon containing species defined herein and wherein any alcohol present in said organic solvent does not exceed 40 weight percent of the total solvent, the combined parts by weight of (B) and (C) being from 8 to 80 parts by weight based on 100 parts by weight of (A) and the weight ratio of (B) to (C) being from 0.6 to 40.

The hydroxyl endblocked polydimethylsiloxanes (A) have viscosities of at least 100,000 centipoise (cps.) at 25° C., preferably the viscosities are such that the polydimethylsiloxanes are gums, or above about 1,000,000 cps. at 25° C. Polydimethylsiloxanes which have a viscosity below 100,000 cps. at 25° C. do not provide the combination of properties for a tough elastomer. For the purposes of this invention, the polydimethylsiloxanes can contain small amounts of other diorganosiloxane units, monoorganosiloxane units and

SiO$_2$ units. Such units can be illustrated by methylvinylsiloxane units, diphenylsiloxane units, methylphenylsiloxane units, monomethylsiloxane units and the like. Such siloxane units can be present in amounts which do not substantially change the character of the polydimethylsiloxane, such as a few mol percent. The polydimethylsiloxanes are substantially linear but can contain some branching which means that there may be some molecules with more than two hydroxyl radicals. However, for all practical purposes the polymers of (A) are hydroxyl endblocked polydimethylsiloxanes.

The ethylpolysilicate, (B), and the monoorganotriacetoxysilanes, (C), are well known materials. The organic radicals of the monoorganotriacetoxysilane can be methyl, ethyl, propyl or combinations thereof. The combination of (B) and (C) are pertinent to the success of using them in the composition of this invention, inasmuch as the amounts of these two ingredients in the complete composition is important, as well as their relationship to one another. The ethylpolysilicate, (B), is present in an amount of from 5 to 75 parts by weight per 100 parts by weight of (A), preferably from 15 to 40 parts by weight and optimum properties being obtained in the range of 20 to 30 parts by weight. The monoorganotriacetoxysilane, (C), is present in an amount of from 1 to 20 parts by weight per 100 parts by weight of (A), preferably from 4 to 10 parts by weight with optimum properties obtained in the range of from 6 to 10.

Although (B) can be present in an amount of 5 to 75 parts by weight and (C) can be present in an amount of from 1 to 20 parts by weight, the combined weight of (B) and (C) in the compositions of the invention is from 8 to 80 parts by weight per 100 parts by weight of (A). When this range is violated in either direction, high or low side, the properties of the cured elastomer deteriorate and the storage life is reduced. The preferred combined weights of (B) and (C) are from 19 to 50 parts by weight with the optimum properties being found in the range of 26 to 40 parts by weight. The range of combined weight of (B) and (C) from 8 to about 15 show the shorter storage life such as those having a one to two week storage life.

In addition to the combined weight of (B) and (C) being important to the properties of the resulting composition and cured elastomer, the relative amounts of (B) and (C) to each other is also important to the final composition and the cured properties. The weight ratio of (B) to (C) can be from 0.6 to 40. Outside this weight ratio the storage life decreases and the properties of the cured elastomer decreases. Storage life decreases above a (B) to (C) weight ratio of 40 and the elastomer properties decrease when the weight ratio of (B) to (C) drops below 0.6. Preferably, the weight ratio of (B) to (C) is from 2.5 to 10 with the optimum storage life and elastomer properties obtained with a weight ratio of (B) to (C) of 2.5 to 5.

The organotin carboxylate, (D), can be any of the tin carboxylate catalysts such as dibutyltindiacetate, dibutyltindi-2-ethylhexoate, dibutyltindilaurate and the like. The organotin carboxylate can be present in an amount from 0.1 to 2 parts by weight per 100 parts by weight of (A), preferably from 0.2 to 1 part by weight.

The extending filler, (E), can be any of those extending fillers known such as titanium dioxide, calcium carbonate, quartz, asbestos, diatomaceous earth, iron oxide and the like. The amount of (E) can be from 10 to 150 parts by weight per 100 parts by weight of (A), preferably from 25 to 75 parts by weight. Small amounts of reinforcing silica or carbon black can be present such as up to two parts by weight per 100 parts by weight of (A).

The organic solvent is present in amounts sufficient to provide from 10 to 95 weight percent based on the total weight of the composition. When amounts of solvent used are from 10 to 30 weight percent, the composition is useful as a caulk, for example. When amounts of solvent used are from 40 to 60 weight percent, the composition is a soft paste to fluid material which is readily extrudable. When amounts of solvent used are above 60 weight percent, the composition is fluid and is readily sprayable.

The organic solvents can be aliphatic hydrocarbons, such as mineral spirits, hexane, heptane, naphthas; chlorinated aliphatic hydrocarbons, such as carbon tetrachloride, methylene chloride, 1,1,1-trichloroethane, ethylene dichloride, perchloroethylene and propylene dichloride; ketones such as acetone, methylethyl ketone, methyl isobutyl ketone, cyclohexanone and diacetone; aromatics such as benzene, toluene, xylene and aromatic naphthas; esters such as ethylacetate, isopropylacetate, normal propylacetate, butylacetate, and amylacetate; ethers such as dioxane, dichloroethyl ether, tetrahydrofuran, dibutyl ether and mesityl oxide; and alcohols such as methanol, ethanol, isopropanol, normal propanol, butanol, ethylene glycol, propylene glycol, diethylene glycol, monomethyl ether of ethylene glycol and monomethyl ether of diethylene glycol.

The alcohols are used in amounts up to 40 weight percent of the total organic solvent and should not be used as the only solvent or in amounts of greater than 40 weight percent of the organic solvent content. Preferably, the alcohol is present in amounts of up to 20 weight percent of the total organic solvent content. The preferred solvents are mineral spirits and mixtures of mineral spirits and butanol. The alcohols provide an added degree of storage life and do not effect the physical properties of the cured elastomer to any significant degree.

The combination of organic solvent, high viscosity polydimethylsiloxane and the defined combination of ethylpolysilicate and monoorganotriacetoxysilane work together in some yet unknown manner to provide a storage life beyond what was previously obtainable and still result in excellent physical properties in the cure elastomer. Thus, physical properties have not been sacrificed to obtain storage life and storage life is not sacrificed to obtain physical properties.

Other conventional ingredients used in silicone rubber such as heat stability additives, pigments and colorants, flame retardant additives, thickeners and the like can be used in these compositions.

The compositions of this invention can be prepared by mixing the ingredients in various ways most of which preferably add the organotin carboxylate, (D), last. However, the best method for mixing is to combine the organic solvent, except for any alcohol to be used, with the extending filler, (E), and then add the polydimethylsiloxane, (A), thereafter adding to this mixture, ethylpolysilicate, (B), any alcohol, monoorganotriacetoxysilane, (C), and finally the organotin carboxylate last. Conventional mixers and mills can be used for the mixing operations, however, some precautions should be taken when handling the monoorganotriacetoxysilane and mixtures containing same because these materials are particularly sensitive to reaction with moisture. The storage life of the compositions can be extended if care is used to remove moisture and to keep moisture from getting into the prepared compositions.

The compositions of this invention can be used as caulks, sealants, sprayable paints, roof coatings and the like. Adhesion of the cured elastomer to concrete, wood and polyurethane foam without primers is sufficient to use these compositions in building construction.

The following examples are presented for illustrative purposes and should not be construed as limiting this invention which is properly delineated in the claims. In the following examples all parts are parts by weight except where otherwise stated and all viscosities are at 25° C. unless otherwise stated.

EXAMPLE 1

A mixture was prepared by thoroughly wetting 75 parts of calcium carbonate with 225 parts of mineral spirits in a mixer and then adding 100 parts of a hydroxyl endblocked polydimethylsiloxane gum having a Williams plasticity between 0.055 and 0.059 inch. The gum contained about one weight percent fume silica. To this base mixture varying amounts of ethylpolysilicate was added and then in order an equal weight mixture of methyltriacetoxysilane and ethyltriacetoxysilane and an equal weight mixture of dibutyltindi-2-ethylhexoate and xylene. The amounts of these ingredients added to the base mixture were as shown in Table I where the ethylpolysilicate is identified as "EPS", the mixture of methyltriacetoxysilane and ethyltriacetoxysilane is identified as "acetoxysilane" and the mixture of dibutyltindi-2-ethylhexoate and xylene is identified as "catalyst". The physical properties shown in Table I were obtained on samples cured at room temperature for 7 days by ASTM methods, tensile and elongation at break by ASTM-D-412 and Die "B" tear strength by ASTM-D-624-54. The viscosities shown in Table I were obtained from the dial readings of a Brookfield HBT viscometer using a No. 5 spindle at 50 r.p.m. The composition described by Reference No. 4 remained fluid after 4.5 months of storage and cured to an elastomer having similar properties as shown in Table I.

Table I

| Reference No. | EPS, parts | Acetoxy-silane, parts | Cata-lyst, parts | Duro-meter Shore A | Ten-sile, p.s.i. | Elonga-tion, % | Tear Strength, p.p.i. | Brookfield Viscosity | |
|---|---|---|---|---|---|---|---|---|---|
| | | | | | | | | After 3 days | After 10 days |
| 1. | 0 | 4 | 1.0 | 52 | 300 | 700 | 48 | * | * |
| 2. | 5 | 4 | 1.0 | 55 | 585 | 730 | 69 | >100 | >100** |
| 3. | 10 | 4 | 1.0 | 55 | 645 | 700 | 69 | 63.5 | 67.7 |
| 4. | 25 | 4 | 1.0 | 57 | 540 | 500 | 65 | 35.5 | 37.9 |
| 5. | 40 | 4 | 1.0 | 62 | 600 | 400 | 66 | 37.7 | 38.4 |
| 6. | 0 | 4 | 0.5 | 55 | 400 | 658 | 58 | * | * |
| 7. | 25 | 4 | 0.5 | 57 | 560 | 600 | 65 | 33.2 | 33.0 |
| 8. | 0 | 4 | 2.0 | 53 | 300 | 875 | 39 | * | * |
| 9. | 25 | 4 | 2.0 | 55 | 720 | 650 | 75 | 37.2 | 38.0 |
| 10. | 25 | 4 | 1.0 | 55 | 720 | 440 | 68 | 17.9 | 18.9 |
| 11. | 0 | 8 | 1.0 | 53 | 240 | 530 | 62 | 32.0 | 34.0 |

*Gelled in container in less than 3 days
**Showed slight gel in container after 10 days
***Contains 25 parts of butanol

EXAMPLE 2

Compositions were prepared as described in Example 1 using the same ingredients, except 50 parts of calcium carbonate and 200 parts of mineral spirits were used and the catalyst was used in an amount of 1.0 part. The properties and viscosities were determined as described in Example 1 and were as shown in Table II, except the Brookfield was run at 20 r.p.m. instead of 50 r.p.m.

Table II

| Reference No. | EPS, parts | Acetoxy-silane, parts | Duro-meter, Shore A | Ten-sile, p.s.i. | Elonga-tion, % | Tear Strength, p.p.i. | Brookfield Viscosity, After | | |
|---|---|---|---|---|---|---|---|---|---|
| | | | | | | | 1 day | 1 week | 1 month |
| 1. | 0 | 4 | 34 | 218 | 995 | 31 | 31.0 | * | |
| 2. | 5 | 4 | 36 | 550 | 835 | 35 | 62.5 | ** | |
| 3. | 5 | 6 | 37 | 525 | 860 | 35 | 27.5 | 30.5 | 29.0 |
| 4. | 5 | 8 | 40 | 658 | 775 | 42 | 34.2 | 33.0 | 33.0 |
| 5. | 10 | 4 | 37 | 578 | 920 | 47 | 47.0 | 59.0 | ** |
| 6. | 15 | 4 | 35 | 480 | 835 | 33 | 45.5 | ** | |
| 7. | 15 | 6 | 40 | 638 | 825 | 47 | 26.5 | 28.5 | 28.0 |
| 8. | 15 | 8 | 43 | 590 | 525 | 51 | 28.2 | 28.0 | 27.5 |
| 9. | 20 | 4 | 43 | 585 | 705 | 46 | 64.4 | 64.0 | 66.0 |
| 10. | 25 | 4 | 45 | 653 | 740 | 50 | 50.0 | 46.2 | 47.5 |
| 11. | 25 | 6 | 47 | 650 | 625 | 42 | 26.0 | 36.0 | 25.5 |
| 12. | 25 | 8 | 43 | 650 | 640 | 54 | 21.5 | 21.5 | 20.0 |
| 13. | 30 | 4 | 45 | 608 | 645 | 47 | 52.4 | 49.0 | 50.5 |
| 14. | 40 | 4 | 51 | 598 | 405 | 46 | 36.5 | 36.2 | 35.0 |
| 15. | 50 | 2 | 42 | 625 | 645 | 70 | 50.7 | 51.0 | 51.3**** |

*Gelled in container in less than 3 days
**Showed slight gel in container after 10 days
****Reading obtained after 3 weeks

EXAMPLE 3

A composition was prepared as described in Example 1, but where the ingredients were 204 parts of mineral spirits, 100 parts of 5 micron quartz, 100 parts of a hydroxyl endblocked polydimethylsiloxane having a viscosity as defined in Table III, 20 parts of ethylpolysilicate, 6 parts of "acetoxysilane", one part of "catalyst" and 22 parts of butanol. The properties were determined as described in Example 1, for 7 days cure at room temperature and one month cure at room temperature.

Table III

| | Seven Days Cure | | | | One Month Cure | | | |
|---|---|---|---|---|---|---|---|---|
| Polymer Viscosity, cps. | Duro-meter, Shore A | Ten-sile, p.s.i. | Elonga-tion, % | Tear Strength p.p.i. | Duro-meter Shore A | Ten-sile, p.s.i. | Elonga-tion, % | Tear Strength p.p.i. |
| 12,000 | 68 | 595 | 100 | 36 | 74 | 800 | 65 | 45 |
| 300,000 | 60 | 600 | 190 | 42 | 64 | 760 | 180 | 50 |
| 3,000,000 | 52 | 630 | 280 | 41 | 56 | 745 | 300 | 46 |

Table III-continued

| Polymer Viscosity, cps. | Seven Days Cure | | | | One Month Cure | | | |
| --- | --- | --- | --- | --- | --- | --- | --- | --- |
| | Durometer, Shore A | Tensile, p.s.i. | Elongation, % | Tear Strength p.p.i. | Durometer Shore A | Tensile, p.s.i. | Elongation, % | Tear Strength p.p.i. |
| 6,000,000 | 50 | 740 | 310 | 47 | 56 | 1045 | 330 | 55 |

EXAMPLE 4

A composition was prepared as described in Example 1 using the following ingredients: Composition A, 250 parts of mineral spirits, 100 parts of 5 micron quartz, 12.5 parts of asbestos, 100 parts of hydroxyl endblocked polydimethylsiloxane gum as defined in Example 1, 15 parts of EPS, 6 parts of "acetoxysilane" and 1 part of "catalyst". Composition B, was the same as Composition A except 20 parts of EPS and 4 parts of "acetoxysilane" were used. The properties were determined as described in Example 1 after seven days cure and one month cure at room temperature. The results were as shown in Table IV.

Table IV

| Composition | Seven Day Cure | | One Month Cure | |
| --- | --- | --- | --- | --- |
| | A | B | A | B |
| Durometer, Shore A | 60 | 60 | 63 | 60 |
| Tensile, p.s.i. | 518 | 540 | 605 | 570 |
| Elongation, % | 280 | 300 | 315 | 275 |
| Tear Strength, p.p.i. | 77 | 78 | 82 | 108 |

That which is claimed is:

1. A silicone elastomeric composition obtained by mixing ingredients consisting essentially of
   (A) 100 parts by weight of a benzene soluble hydroxyl endblocked polydimethylsiloxane having a viscosity of at least 100,000 cps. at 25° C.
   (B) from 5 to 75 parts by weight of a soluble ethylpolysilicate,
   (C) from 1 to 20 parts by weight of monoorganotriacetoxysilane wherein the organic radical is an alkyl radical of less than four carbon atoms,
   (D) from 0.1 to 2 parts by weight of organotin carboxylate,
   (E) from 10 to 150 parts by weight of an extending filler, and
   (F) sufficient organic solvent to provide a solvent content of from 10 to 95 weight percent solvent based on the total weight of the composition, said organic solvent being selected from the group consisting of aliphatic hydrocarbons, chlorinated aliphatic hydrocarbons, aromatic hydrocarbons, ketones, esters, ethers and mixtures thereof wherein said organic solvent is a solvent for the silicon containing species and alcohol does not exceed 40 weight percent of the total solvent, the combined parts by weight of (B) and (C) being from 8 to 80 parts by weight based on 100 parts by weight of (A) and the weight ratio of (B) to (C) being from 0.6 to 40.

2. The silicone elastomeric composition according to claim 1 in which (B) is present in an amount of from 15 to 40, (C) is present in an amount of from 4 to 10, the combined parts by weight of (B) and (C) are from 19 to 50 and the weight ratio of (B) to (C) is from 2.5 to 10.

3. The silicone elastomeric composition according to claim 2 in which (B) is present in an amount of from 20 to 30, (C) is present in an amount of from 6 to 10, the combined parts by weight of (B) and (C) are from 26 to 40 and the weight ratio of (B) to (C) is from 2.5 to 5.

4. The silicone elastomeric composition according to claim 1 in which (A) has a viscosity of at least 1,000,000 cps. at 25° C.

5. The silicone elastomeric composition according to claim 2 in which (A) has a viscosity of at least 1,000,000 cps. at 25° C.

6. The silicone elastomeric composition according to claim 3 in which (A) has a viscosity of at least 1,000,000 cps. at 25° C.

7. The silicone elastomeric composition according to claim 1 in which the organic solvent is present in an amount of from 40 to 60 weight percent based on the total weight of the composition.

8. The silicone elastomeric composition according to claim 5 in which the organic solvent is present in an amount of from 40 to 60 weight percent based on the total weight of the composition.

9. The silicone elastomeric composition according to claim 1 in which the monoorganotriacetoxysilane of (C) is a mixture of methyltriacetoxysilane and ethyltriacetoxysilane.

10. The silicone elastomeric composition according to claim 8 in which the monoorganotriacetoxysilane of (C) is a mixture of methyltriacetoxysilane and ethyltriacetoxysilane.

* * * * *